Feb. 16, 1926.                                                         1,573,325
                              J. F. NORTON
                  ROTARY VALVE AND CARBON REMOVER THEREFOR
                         Filed Feb. 20, 1923        2 Sheets-Sheet 1

Inventor:
John F. Norton,
by his attorney,
Charles N. Gooding.

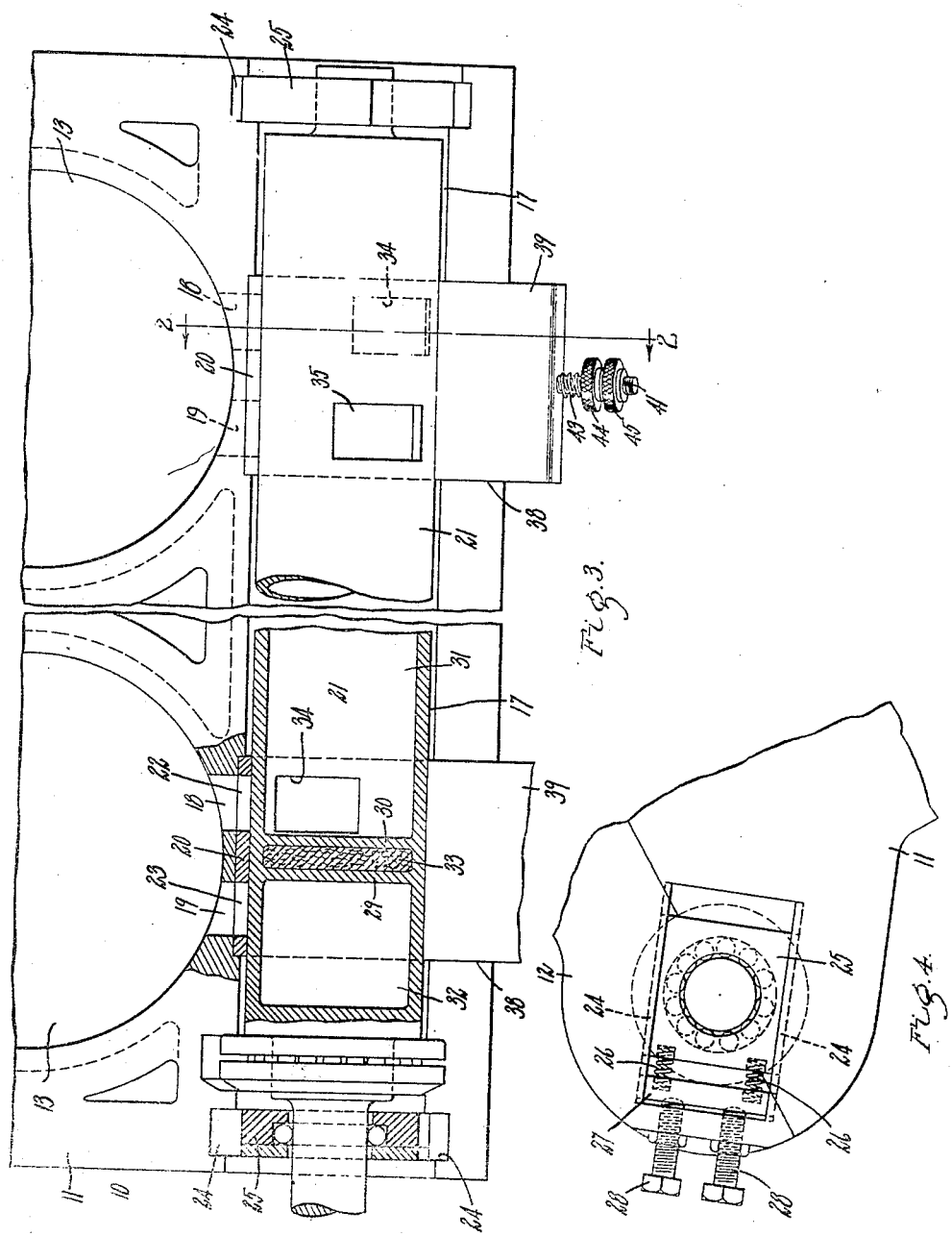

Patented Feb. 16, 1926.

1,573,325

UNITED STATES PATENT OFFICE.

JOHN F. NORTON, OF BOSTON, MASSACHUSETTS.

ROTARY VALVE AND CARBON REMOVER THEREFOR.

Application filed February 20, 1923. Serial No. 620,272.

*To all whom it may concern:*

Be it known that I, JOHN F. NORTON, a citizen of the United States, residing at Boston, in the county of Suffolk and State of Massachusetts, have invented new and useful Improvements in Rotary Valves and Carbon Removers Therefor, of which the following is a specification.

This invention relates to an improvement in rotary valves and carbon removers therefor.

The object of the invention is to provide a rotary valve constructed and arranged to control the admission of fuel to the combustion chambers of an internal combustion engine through an intake port thereof and the discharge of exhaust gases from said combustion chamber through an exhaust port thereof, said rotary valve being constructed in such a manner that the portion of the periphery thereof adjacent to the intake and exhaust ports will always be a tight fit, thereby preventing the fuel or the products of combustion from leaking around the periphery of said valve.

Another object of the invention is to provide means mounted upon the engine for scraping that portion of the periphery of the rotary valve which is located adjacent to the intake and exhaust ports and thereby remove from said valve all carbonized matter which collects thereon and which would eventually retard the rotation of the valve.

The invention consists in the combination and arrangement of parts whereby the above objects and certain other objects hereinafter appearing may be attained as set forth in the following specification and particularly pointed out in the claims.

Referring to the drawings,

Fig. 3 is a plan view illustrating a portion of two cylinders with the cylinder head removed, together with the valve mechanism for said cylinders, a portion of said valve mechanism being broken away and illustrated in section as if taken on the line 3—3 of Fig. 2.

Fig. 4 is an end elevation illustrating in detail one of the adjustable bearing units for the rotary valve.

Like numerals refer to like parts throughout the several views of the drawings.

Figure 1:
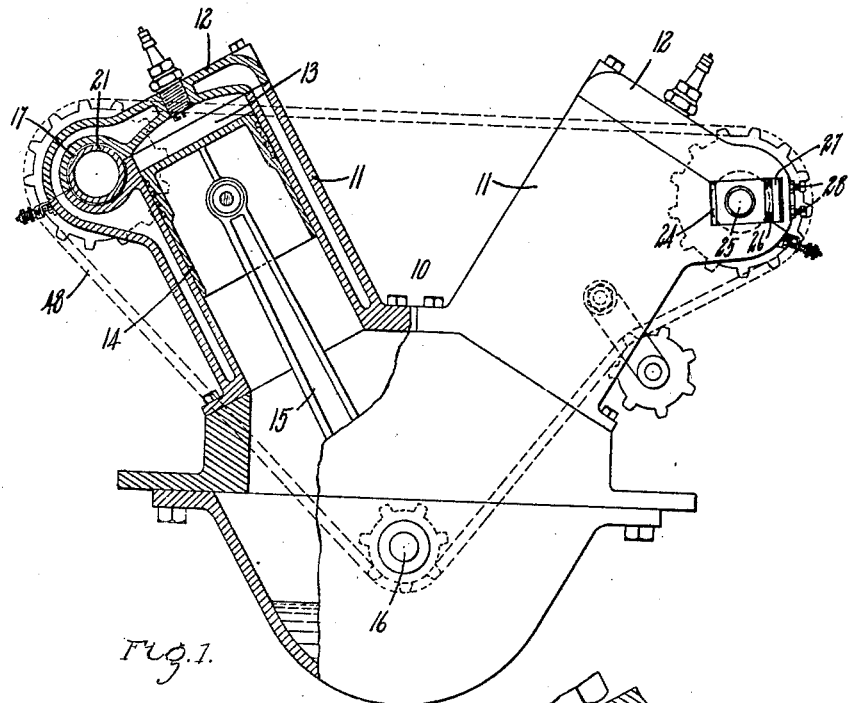
Figure 1 is a partial end elevation and partial vertical section of an internal combustion engine illustrating a rotary valve and scraper therefor embodying my invention in connection therewith.

In the drawings, 10 represents an internal combustion engine of any suitable type, the same being provided with cylinders 11, cylinder heads 12, combustion chambers 13, pistons 14, piston rods 15 and a crank shaft 16. Formed partly in the cylinder 11 and partly in the cylinder head 12 is a cylindrical valve chamber 17, and an intake port 18 and exhaust port 19 connect said valve chamber with the combustion chamber 13 of each cylinder of the engine. Located within the valve chamber 17 adjacent to the ports 18 and 19 is a bushing 20 for a cylindrical valve 21. The bushing 20 is also cylindrical in form and provided with an intake port 22 aligning with the intake port 18 and an exhaust port 23 aligning with the exhaust port 19.

Formed partly in the cylinder 11 and partly in the cylinder head 12 are ways 24 between which a bearing unit 25, preferably a ball bearing of any suitable construction, is mounted and the valve 21 is rotatably mounted at each end thereof in one of these bearing units. The bearing units 25, together with the valve 21 mounted therein, are moved laterally thereof to force the periphery of said valve toward the intake and exhaust ports 22 and 23 by means of springs 26 which are interposed between the bearing units 25 and sliding blocks 27 which are also mounted between the ways 24 and the tension upon the springs 26 may be increased or decreased as desired through the medium of a plurality of adjusting screws 28 which are mounted in the cylinder head 12 with their ends abutting against the sliding block 27.

The valve 21 is preferably hollow and is provided with partitions 29 and 30 located opposite each cylinder, said partitions dividing the interior of the valve 21 into intake chambers 31 and exhaust chambers 32 between which is an insulating chamber 33 which is preferably filled with a suitable non-heat conducting material as, for example, asbestos or plaster of Paris, or if it is so desired, said chamber 33 may simply constitute a dead air space. An intake port 34 is provided in the valve 21 communicating with the chamber 31 and an exhaust port 35 is likewise provided in said valve communicating with the exhaust chamber 32. Another port 36 is provided in the bushing 20 and said port aligns with a passage 37 formed in the engine cylinder and connects with an intake manifold not illustrated in the drawings, but well known to those skilled in the art. Another port similar to the port 36 and passage similar to the passage 37 is provided which connect the valve chamber 17 with an exhaust manifold not illustrated in the drawings, but also well known to those skilled in the art, said last-named port and passage aligning with the port 36 and passage 37 illustrated in Fig. 2.

Mounted in ways 38 provided between the cylinder 11 and cylinder head 12 is a scraper 39 constituting a carbon remover, the inner extremity of which is bevelled at 40 and contacts with the periphery of the valve 21. A screw 41 permanently secured in any suitable manner within the cylinder 11 projects through an angular portion 42 of the scraper 39, and a spring 43, one end of which abutting against the portion 42 of the scraper 39, while the other end abutting against an adjusting nut 44 mounted upon the screw 41 acts to always force said scraper toward the valve 21 and the pressure with which said scraper contacts with said valve is regulated through the medium of the adjusting nut 44 which is then clamped against rotation upon the screw 41 through the medium of a check nut 45. Another nut 46 is mounted upon the screw 41 and said nut is utilized to force the scraper 39 out of contact with the valve 21 at such times as it is not desired to have said scraper contacting with the periphery of said valve. A discharge passage 47 is provided in the cylinder 11 adjacent to the inner edge of said scraper and all matter scraped from the periphery of the valve 21 by the scraper 39 may pass downwardly through said passage.

Figure 2:
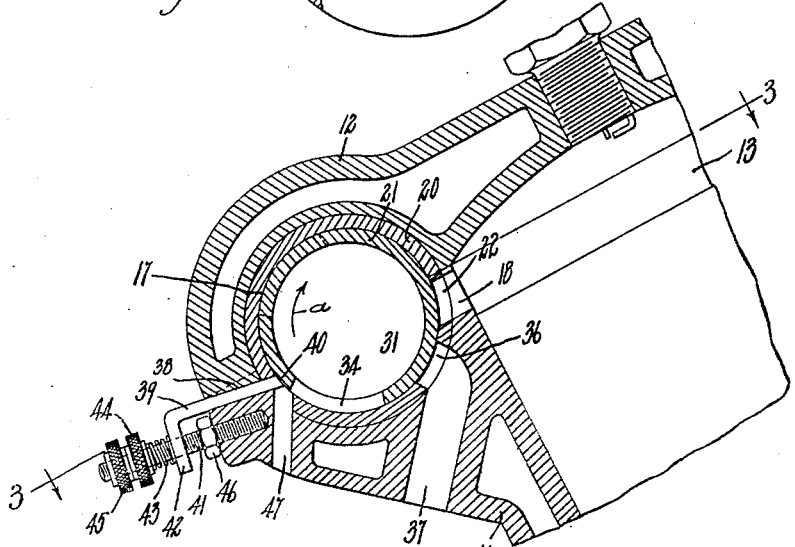
Fig. 2 is a enlarged detail trasverse section through the valve mechanism and scraper therefor as taken on the line 2—2 of Fig. 3.

The valve 21 rotated in the direction of the arrow $a$, Fig. 2, through the medium of a chain 48 or by any other suitable mechanism is always forced laterally by the springs 26 toward the various ports leading between the valve chamber 17 and the various combustion chambers of the engine and a tight joint is, therefore, always maintained to prevent leakage both of the fuel and of the exhaust around said valve. At the same time all products of combustion together with any moisture such as oil and grease, which collect upon the valve 21, are removed therefrom by the scraper 39 and said materials pass downwardly through the discharge passage 47. The scraper 39 may be used continually or at intervals as may be desired and the pressure with which it contacts with the periphery of the valve is easily regulated through the medium of the units 44 and 45, and when after long continued use it becomes necessary to replace a worn scraper with a new one the same may be easily and quickly accomplished without disturbing the valve mechanism or other parts of the engine.

I claim:

1. An internal combustion engine embodying therein a rotary valve, a scraper mounted upon said engine and yieldingly engaging the periphery of said valve and means to vary the pressure of said scraper upon said valve.

2. An internal combustion engine embodying therein a rotary valve, a scraper mounted upon said engine and yieldingly engaging the periphery of said valve, means to vary the pressure of said scraper upon said valve and means to force said scraper into engagement with said rotary valve.

3. An internal combustion engine embodying therein a cylinder, a cylinder head fast to said cylinder, a rotary valve, a scraper slidably mounted between said cylinder and said cylinder head, means to force said scraper against the periphery of said valve and means to vary the pressure of said scraper upon said valve.

4. An internal combustion engine embodying therein a cylinder provided with a discharge passage therein, a cylinder head fast to said cylinder, a rotary valve, a scraper slidably mounted between said cylinder and said cylinder head, means to force said scraper against the periphery of said valve to remove the products of combustion therefrom, said products of combustion being discharged through said discharge passage and means to vary the pressure of said scraper upon said valve.

In testimony whereof I have hereunto set my hand.

JOHN F. NORTON.